(12) United States Patent
Kaen et al.

(10) Patent No.: US 12,355,547 B2
(45) Date of Patent: Jul. 8, 2025

(54) SECURE GLOBAL SATELLITE NETWORK

(71) Applicants: Hooshang Kaen, Los Angeles, CA (US); James Kaen, Los Angeles, CA (US)

(72) Inventors: Hooshang Kaen, Los Angeles, CA (US); James Kaen, Los Angeles, CA (US)

( * ) Notice: Subject to any disclaimer, the term of this patent is extended or adjusted under 35 U.S.C. 154(b) by 0 days.

(21) Appl. No.: 17/483,673

(22) Filed: Sep. 23, 2021

(65) Prior Publication Data

US 2022/0094431 A1     Mar. 24, 2022

Related U.S. Application Data

(60) Provisional application No. 63/082,470, filed on Sep. 24, 2020.

(51) Int. Cl.
*H04B 7/185* (2006.01)

(52) U.S. Cl.
CPC ..... *H04B 7/18591* (2013.01); *H04B 7/18563* (2013.01); *H04B 7/18573* (2013.01); *H04B 7/18582* (2013.01); *H04B 7/18589* (2013.01)

(58) Field of Classification Search
CPC ................ H04B 7/185; H04B 7/18513; H04B 7/18515; H04B 7/18519; H04B 7/18521; H04B 7/18526; H04B 7/18539; H04B 7/19; H04B 7/195; H04W 84/06
See application file for complete search history.

(56) References Cited

U.S. PATENT DOCUMENTS

| | | | | |
|---|---|---|---|---|
| 4,691,882 A | * | 9/1987 | Young | H04B 7/18521 455/13.1 |
| 5,906,337 A | * | 5/1999 | Williams | B64G 1/1085 455/13.1 |
| 5,971,324 A | * | 10/1999 | Williams | H04B 7/195 342/356 |
| 6,009,306 A | * | 12/1999 | Hargis | H04B 7/19 455/12.1 |
| 6,219,617 B1 | * | 4/2001 | Dreischer | G01S 5/0081 455/12.1 |
| 8,800,932 B2 | * | 8/2014 | Liu | B64G 1/1007 244/158.4 |

(Continued)

*Primary Examiner* — April G Gonzales
(74) *Attorney, Agent, or Firm* — Makoui Law, PC; Ali Makoui

(57) ABSTRACT

The focus of the present disclosure relates to a secure global satellite network that securely transmits data from a ground station to one or more geosynchronous orbit satellites within a communicatively linked constellation of geosynchronous satellites. The communicatively linked constellation of geosynchronous satellites covers the entire planet, allowing access to users anywhere on the planet. The communicatively linked constellation of geosynchronous satellites also covers satellites in orbit above the planet, enabling any satellite to send or receive data through the communicatively linked constellation of geosynchronous satellites at any point in the satellite's orbit. The communicatively linked constellation of geosynchronous satellites functions as a communications backbone, enabling global communications coverage between any points on the earth, between any point on the earth and a satellite anywhere in its orbit, or between two satellites anywhere in their orbit.

20 Claims, 1 Drawing Sheet

(56) References Cited

U.S. PATENT DOCUMENTS

| | | | | |
|---|---|---|---|---|
| 10,512,021 | B2* | 12/2019 | Chong | H04B 7/195 |
| 10,958,335 | B2* | 3/2021 | Kaen | H04W 84/06 |
| 2014/0016941 | A1* | 1/2014 | Coleman | H04B 7/18521 |
| | | | | 398/121 |
| 2016/0269100 | A1* | 9/2016 | Welle | H04B 7/18513 |
| 2018/0152235 | A1* | 5/2018 | Smoot | H04B 7/1851 |
| 2018/0309508 | A1* | 10/2018 | Regan | H04B 7/18584 |
| 2018/0323863 | A1* | 11/2018 | Bournes | H04B 7/18508 |
| 2023/0262590 | A1* | 8/2023 | Määttänen | H04B 7/18539 |
| | | | | 370/329 |
| 2023/0281527 | A1* | 9/2023 | Cella | G06Q 10/063118 |
| | | | | 705/7.17 |

* cited by examiner

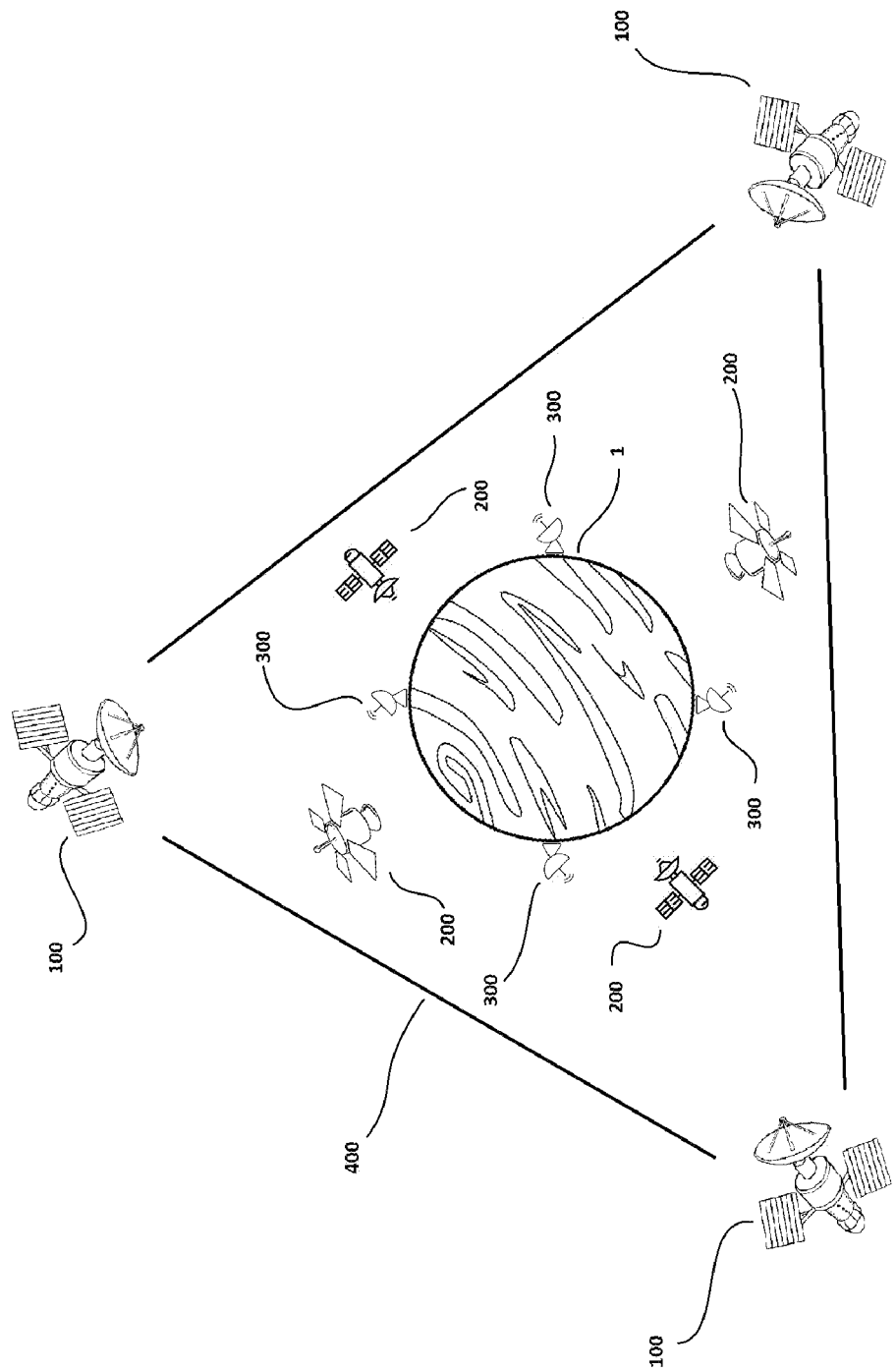

SECURE GLOBAL SATELLITE NETWORK

INCORPORATION BY REFERENCE TO RELATED APPLICATIONS

This patent application is a continuation of U.S. provisional patent application No. 63/082,470, titled "SECURE GLOBAL SATELLITE NETWORK" and filed Sep. 24, 2020.

This patent application additionally incorporates by reference the following patents and patent applications: U.S. patent application Ser. No. 15/225,826, titled "SPACE-BASED ELECTRONIC DATA STORAGE AND TRANSFER NETWORK SYSTEM" and filed Aug. 2, 2016, International Application No. PCT/US16/16467, titled "SPACE-BASED ELECTRONIC DATA STORAGE AND TRANSFER NETWORK SYSTEM" and filed Feb. 3, 2016, U.S. Provisional Application No. 62/111,600, titled "Sky-Cloud Autonomous Electronic Data Storage and Information Delivery Network System" and filed Feb. 3, 2015, U.S. patent application Ser. No. 16/174,209, titled "INTERMEDIARY SATELLITE NETWORK FOR CROSS-STRAPPING AND LOCAL NETWORK DECONGESTION" and filed Oct. 29, 2018, PCT/US16/30276, titled "INTERMEDIARY SATELLITE NETWORK FOR CROSS-STRAPPING AND LOCAL NETWORK DECONGESTION" and filed Apr. 28, 2017, and U.S. patent application Ser. No. 16/389,938, titled "Earth Observation Satellite Information Routing System" and filed Apr. 20, 2019. Each of the above patents and patent applications is expressly incorporated by reference in its entirety.

BACKGROUND

Field of the Invention

This patent document relates generally to a communication network for securely transferring data to orbital satellites. This application relates more particularly to a communication network for securely transferring data from any first point on Earth or in orbit to any second point on Earth or in orbit, through a communicatively linked network of geosynchronous or geostationary earth orbit (GEO) satellite, eliminating reliance on ground-based data transfers or intermediate low earth orbit (LEO) or medium earth orbit (MEO) satellites.

Description of the Related Art

A communication chain is only as secure as its least secure element. Satellite communication often consists of a combination of ground-based and air-based communications. Many satellite communications are routed through multiple ground communication nodes on the path from a sender to an intended recipient. Ground-based communications nodes, such as antenna farms may be more susceptible to snooping or hacking than secure, targeted communications directed to or from a satellite or between satellites.

Currently a message transmitted from a first point on the globe to a second point on the globe can travel exclusively through ground-based communication routes, through a combination of ground-based and space-based communications routes, or through a series of multiple hops to and from orbital satellites. The ground-based may include either or both of wired or electromagnetic communication (e.g., radio, microwave, or laser). An exemplary ground-based communication path could include a phone call travelling through a combination of cellular networks and hard wires from Dallas to New York City.

The inventors here have recognized that there are significant security risks inherent in routing satellite communications through ground nodes on the way to the intended recipient. Accordingly, it is here recognized that a continued need exists to overcome and improve upon such security shortcomings in conventional satellite networks.

SUMMARY

Therefore, there exists a continuing need for a new and improved solution (the Secure Global Satellite Network) that can provide a system for securely transferring data from a sender at a first point anywhere on the Earth (or in orbit) to a recipient at a second point anywhere on the Earth (or in orbit) without routing that data through any ground communication nodes. The sender targets a message to a geostationary satellite in the Secure Global Satellite Network, and that message need not be routed back through any ground-based nodes until reaching its final destination, significantly reducing the risk of snooping, hacking, or interception.

The Secure Global Satellite Network comprises a plurality of communicatively linked satellites in geostationary orbit around the Earth. A constellation of 3 or more geostationary satellites is capable of providing total coverage for the Earth as well as any satellites in LEO or MEO orbit around the Earth. Each of the geostationary satellites may be linked to the other geostationary satellites in the Secure Global Satellite Network by laser link or traditional RF communications. A sender can securely transmit data from a ground station through a targeted beam transmitted to a first geostationary satellite. This targeted beam may be transmitted from a normal V-Sat dish or any alternate transmission systems without departing from the present invention. If the data is intended for a destination that is also covered by the same GEO satellite, than the data will be directly transmitted back to the intended destination, be that a ground-based system or an orbital satellite. If the data is intended for a destination that is covered by one of the other GEO satellites in the GEO constellation, than the first GEO satellite routes the data to the second (or other) GEO satellite, and the second (or other) GEO satellite transmits the data to the intended destination, be that a ground-based system or an orbital satellite. With a constellation of at least 3 GEO satellites, data can be quickly and securely transmitted between any two points on or orbiting the Earth. The Secure Global Satellite Network increases communications efficiency and decreases transmission delay by approximately 25% compared to existing space based geostationary global systems.

BRIEF DESCRIPTION OF THE DRAWINGS

FIG. 1 is a representation of a first embodiment of the Secure Global Satellite Network.

DETAILED DESCRIPTION OF THE EMBODIMENTS

Various aspects are described in connection with an illustrative implementation of a Secure Global Satellite Network disclosed herein. The various aspects are disclosed in the written specification including the drawings, and claims, and may be combined to form claims for a device, apparatus, system method of manufacture and/or use in any way, consistent with the teachings herein, without limitation. The features, aspects and advantages are described below with reference to the drawings, which are intended to illustrate but not to limit the invention. It should be understood, however, that the teachings herein are not limited to any particular satellite application or configuration and are applicable to alternative satellite applications and/or configurations, in other orbits, and in other combinations, beyond what is expressly disclosed in this patent application.

The Secure Global Satellite Network comprises a global communication system 10 that communicates from any first position on or orbiting the planet 1 to any second position on or orbiting the planet 1 by routing communications through a constellation of at least 3 communicatively linked geosynchronous or geostationary (GEO) satellites 100 positioned in an equatorial orbit above the planet 1. Each GEO satellite 100 in the GEO constellation is communicatively linked to other GEO satellites 100 in the GEO constellation with either LASER or radio frequency (RF) transponders.

Although the disclosure primarily describes an embodiment that routes communications through a number of communicatively linked geosynchronous or geostationary satellites 100, with minimal adjustment a satellite network could also be designed to incorporate the core inventive concepts of the present application by routing information through satellites in non-GEO orbits. For example, a Secure Global Satellite Network 10 could function effectively and securely while routing communications through a network of middle earth orbit (MEO) satellites. Such a MEO satellite configuration would incorporate capability to track and communicate with a MEO satellite with apparent motion relative to the surface of the planet. The math, satellite components, and functionality of such a satellite system would function effectively identical to the disclosed GEO embodiments.

In a first embodiment, the GEO constellation of the Secure Global Satellite Network 10 comprises 3 or more GEO satellites 100. In alternate embodiments, the GEO constellation of the Secure Global Satellite Network 1—may incorporate more than 3 GEO satellites 100, providing greater coverage, shorter communications paths, communication path redundancy, and/or future upgrade capabilities. Additional GEO satellites 100 may be added to the GEO constellation of the Secure Global Satellite Network 10 after the initial GEO constellation is launched. In some embodiments, GEO satellites 100 in the GEO constellation of the Secure Global Satellite Network 10 may all be identical with identical features and transponders. In an alternate embodiment, some GEO satellites 100 in the GEO constellation of the Secure Global Satellite Network 10 may carry different functionality, features, technology, or transponders. Some GEO satellites 100 in the GEO constellation of the Secure Global Satellite Network 10 may have different functionality, features, technology, or transponders to better match the differences between different regions of the Earth, including different geography, different communication preferences, different security, different interference, or different licensing requirements for the different regions of the globe that they cover. Some GEO satellites 100 in the GEO constellation of the Secure Global Satellite Network 10 may have different functionality, features, technology, or transponders based on improvements made between satellite manufacture date or a shift in satellite preferences or updated plans. In some embodiments, different GEO satellites 100 in the GEO constellation of the Secure Global Satellite Network 10 may be configured differently to match the unique geography covered by each GEO satellite 100.

Existing GEO satellites 100 in the Secure Global Satellite Network 10 may be re-tasked or repositioned within the orbit to account for the added GEO satellites 100, increasing communications efficiency, decreasing latency, or optimizing for geographic or population coverage on the planet below. In some cases, older GEO satellites 100 from the GEO constellation of the Secure Global Satellite Network 10 may be retired, and removed from the GEO constellation, including potentially repositioning the retired satellites to back-up holding orbits or directed toward the Earth 1 to be destroyed during atmospheric re-entry. Additionally, GEO satellites 100 in the GEO constellation of the Secure Global Satellite Network 10 may be upgraded, modified, repaired, or repositioned with a coupling satellite launched to join with the existing GEO satellites 100 and add additional functionality, additional features, to replace malfunctioning elements, or even just additional propellant to extend the useful life of a GEO satellite 100.

In one aspect, each GEO satellite 100 in the Secure Global Satellite Network 10 may include all of the elements of conventional geosynchronous satellites, including at least a power system, one or more communications arrays, one or more data storage elements, and a control system.

The power system may comprise one or more power sources (e.g., a solar panel, thermal harvesting, atomic fusion, atomic fission, chemical decay, or a free electron gathering system) electrically coupled to one or more batteries. A solar panel may collect solar energy to power the satellite and recharge the batteries. The batteries provide back-up power when the satellite is shaded from the sun's rays by a planet or other body. In one aspect, the satellite includes robotics and electronic instructions capable of opening and closing the solar panel or directing the solar panel toward or away from the source of light to increase or decrease the energy absorbed. It may be beneficial to increase energy absorption prior to entering or just after leaving the earth's shade. It may additionally be beneficial to decrease energy absorption when the battery is near full or the satellite needs to reduce thermal energy.

The data storage elements may be powered by the power system and is coupled to the communications array through the processor. The data storage element can comprise magnetic hard drives, flash memory, 3D NAND memory, and/or holographic memory. The data storage elements may be specially configured and mounted to dampen the pressure and vibration during launch, the temperature and pressure extremes in the vacuum of space, and/or radiation exposure outside of a planetary atmosphere. A magnetic hard drive may be pressurized and sealed to enable operation in a vacuum. The data storage element may also enter a low power or idle mode. The low power or idle mode may be beneficial to conserve power consumption, reduce heat, or disable some of the data storage elements during low traffic periods. The data storage elements may be shielded to minimize radiative interference. The data storage element may include the ability to flip, reset, or rewrite any corrupted bits.

One or more processors are connected to persistent and/or non-persistent memory and control the operation of the power system, the communications array, and the data storage elements. Multiple satellites can pool processing power to jointly manage computation for complicated processes. The processors or the data storage elements may include encryption and/or deduplication instructions to protect data and to optimize storage. The processors may also include an authorization system to check access point credentials and make certain that the access point is authorized to send or retrieve data prior to providing access to the data storage element.

The communications array may include a wireless communications system or transponder (e.g., laser communication link, microwave relay, or radio frequency transmission) capable of communicating with the other geosynchronous satellites as well as the ground and any LEO or MEO satellites 200 beneath the GEO 100. The wireless communication transponder is configured to communicate between the satellite and an outside system—be that another satellite in the Secure Global Satellite Network, another satellite external to the Secure Global Satellite Network 10, or a terrestrial transponder. The wireless communication transponder communicates via a beam of radio frequency, microwave, or laser light. The transponder may communicate in any beneficial frequency band (e.g., the Ku or Ka band).

In one aspect each GEO satellite's communications array is in constant communication with the communications arrays of the leading GEO satellite 100 immediately in front in the Secure Global Satellite Network 10 and the trailing GEO satellite 100 immediately behind in the Secure Global Satellite Network 10. The GEO satellites 100 of the Secure Global Satellite Network 10 can create a continuous network, allowing any GEO satellite 100 to send data and instructions to or retrieve data and instructions from any other GEO satellite 100 in the Secure Global Satellite Network 10. In another aspect, each GEO satellite 100 is additionally capable of communicating with two or more satellites ahead and two or more satellites behind to improve Secure Global Satellite Network 10 reliability and performance. In still another aspect, one or more GEO satellites 100 in the Secure Global Satellite Network 10 may interface with only one other satellite in the Secure Global Satellite Network 10 without departing from the present invention. A GEO satellite 100 in the Secure Global Satellite Network 10 may also communicate with satellites in alternate orbital planes or orbital radii.

In one illustrative aspect, each GEO satellite 100 may carry a minimum of 3 transponders. In a more particular illustrative aspect, each GEO satellite 100 may carry transponders directed in a minimum of 3 different target directions. For example, in a three satellite GEO constellation (satellites GEO1, GEO2, and GEO3), the first transponders of GEO1 (a first GEO satellite) targets and communicates directly with GEO2 (a second other GEO satellite in front or ahead of GEO1 in the orbit), the second transponders of GEO1 targets and communicates directly with GEO3 (a third GEO satellite behind or trailing GEO1 in the orbit), and the third transponders aims toward the Earth 1, centered on the equator directly below GEO1 and providing satellite coverage for ground terminals 300 on the entire planet 1 below, as well as any lower-orbiting satellites (VLEO, LEO, MEO, HEO) 200 as they pass between GEO1 and the Earth 1.

The transponders may be either LASER or RF transponders, establishing LASER or RF communications links 400 between GEO satellites 100. In some embodiments, each of the transponders disclosed in the embodiment above may actually comprise multiple transponders covering a variety of communications bands. In some embodiments, the RF or laser transponder frequencies will be incorporated according with ITU's rules and regulations. These transponders may include some or all of LASER, L-band (approximately 1-2 GHz), S-band (2-4 GHz), C-band (approximately 4-8 GHz), X-band (approximately 8-12 GHz), Ku-band (approximately 12-18 GHz), K-band (approximately 18-27 GHz), Ka-band (approximately 26.5-40 GHz), Q-band (approximately 33-50 GHz), V-band (approximately 40-75 GHz), W-band (approximately 75-110 GHz), mm-band/G-band (approximately 110-300 GHz), or any other frequency adopted for satellite communications. Each communications band presents different advantages and disadvantages, such as moisture interference, oxygen interference, energy consumption, or common frequency use in certain regions of Earth or by satellites, and utilizing multiple frequencies takes advantage of multiple advantages while minimizing the disadvantages. Additionally, including multiple transponders across multiple communications bands enables the satellites to flexibly interface with a number of different existing and future systems.

Each GEO satellite 100 may actually incorporate multiple ground-facing transponders in a single frequency band (e.g., Ku or Ka band). For example, a single GEO satellite 100 in the Secure Global Satellite Network 10 may incorporate 4 Earth-facing transponders in the Ku-band to ensure coverage for the entire globe but only a single Earth-facing Ka-band transponder (e.g., for communication with LEO or MEO satellites). Transponders covering different communication bands may actually cover different areas of the globe below. Different frequency bands may require more or fewer transponders to ensure global coverage of ground terminals 400 anywhere on the planet 1 below. Additionally, some frequencies may only target specific portions of the globe (e.g., a GEO satellite 100 may only incorporate a single mm-band/G-band transponder, targeting a specific area of the planet 1 where mm-band/G-band is actually authorized and used).

Some nations or regions of the planet 1 may possess unfavorable atmospheric or meteorological conditions for certain frequencies. For example, the Ka band is more susceptible to rain attenuation than the Ku band, and the Ku band is more susceptible to rain attenuation than the C band, presenting greater challenges to Ka band transmission or adoption in higher precipitation areas. Rain attenuation only affects communications that must transmit through the planet's atmosphere and therefore does not present a challenge for communication between satellites operating outside of a planetary atmosphere. Although in some examples different exemplary frequency bands may be used as an example, nothing in this specification should be read to restrict or limit the use of the present invention to only specific frequencies. Any functional frequency may be incorporated into the present invention without departing from the spirit of the invention.

In some embodiments, the transponders for communications between the GEO satellites 100 include only one communication band, while the ground-facing transponder (i.e., the third transponder in the embodiment described above) may include a number of different communication band transponders. In alternate embodiments, the GEO satellites 100 in the Secure Global Satellite Network 10 also include multiple transponders covering a number of communication bands for communications between the GEO satellites 100. Different GEO satellites 100 in the Secure Global Satellite Network 10 may even include different collections of frequency band transponders, as certain frequencies are more or less common in different parts of the planet 1 (e.g., a GEO1 covering the Americas may incorporate transponders covering frequency bands commonly used in the Americas, while a separate GEO2 covering Asia and Australia may incorporate transponders covering a different set of frequency bands commonly used in Asia and/or Australia). In some embodiments, the GEO satellites 100 enable frequency band cross-strapping, receiving a communication in a first frequency band and retransmitting that communication in a different frequency band, either back toward the planet 1 or toward another GEO satellite 100 in the GEO constellation.

Ground-based communications stations may communicate directly with the ground-facing transponder of any of the GEO satellites 100 in the Global Secure Satellite Network 10, using any communication frequency incorporated and enabled on that particular GEO satellite 100. Based on the widespread adoption of RF-based user terminals and the need to work with existing technology, most initial communication between user terminals and GEO satellites 100 in the Secure Global Satellite Network 10 will communicate through RF signals; however, the system may be designed from the ground up to incorporate and function flawlessly through laser communications. In some embodiments, a ground user can transmit or receive data to or receive data from a GEO satellite 100 of the Secure Global Satellite Network 10 with a standard V-Sat dish 300. This V-Sat dish 300 or alternative transponders employed for communication with the GEO satellites 100 may operate in any of the previously disclosed frequency bands. In one embodiment, ground users anywhere on the planet's surface may employ V-Sat dishes 300 for communication with the GEO satellites 100 of the Secure Global Satellite Network 10.

The Secure Global Satellite Network 10 is configured to function as a communications hub or spine for other subsystems, operating as a reliable, secure, global system for communication optimization and efficiency. The Secure Global Satellite Network 10 may be leveraged to benefit a number of current terrestrial and satellite applications, ranging from video and voice communications and tactical command to global aircraft coverage and global satellite interface.

Current GEO satellite-based communications rely on a multi-hop communication path. In the most efficient modern GEO-satellite communication examples, a single communication path may travel from the originator's ground terminal to a GEO satellite 100, back to a ground antenna farm in the originator's same region of the globe, then transmit by wire or other means to a second antenna farm in the recipient's region of the globe, then transmitted to a second GEO satellite 100 over the second antenna farm, and bounced back to the recipient's ground terminal. This communication path includes 4 light speed trips to or from the Earth's surface to the GEO satellite 100 orbit, 22,236 miles (35, 786 kilometers) above the equator, adding up to 143,144 kilometers. At the speed of light (299,792,458 meters per second), those 4 legs alone will take nearly a half second, and that is ignoring any additional computing delays or transmission delays inherent in the communication path between satellite the two satellite antenna farms. Some even less efficient communication paths even add additional antenna farm-to-satellite-to-antenna farm, further increasing latency. Each jump from the ground to a GEO satellite 100 and back may add nearly a quarter of a second.

Communications between two terrestrial users relying on the Secure Global Satellite Network 10 removes unnecessary ground-GEO satellite-ground communication legs. Instead a communication travels from the originator directly to a first GEO satellite 100, from the first GEO satellite 100 to a second GEO satellite 100 above the recipient, and the second GEO satellite 100 transmits the communication directly to the recipient's ground terminal. The direct communication between the first GEO satellite 100 and the second GEO satellite 100 eliminates the need to transmit the communication from the first GEO satellite 100 to a first antenna farm, from the first antenna farm to a second antenna farm, and from the second antenna farm to the second GEO satellite 100, including the processing and routing delays within and between the antenna farms. The Secure Global Satellite Network 10 reduces transmission delay by at least 25% compared to conventional GEO satellite-based communications systems. The same path works both for one-way transmissions as well as for sustained two-way communications. In cases where the originator and recipient are both positioned in regions covered by the same GEO satellite 100, the system is even more efficient, transmitting only from originator to GEO satellite 100 and directly to recipient.

The reduced transmission delay described above directly benefits any real-time communication systems, including either video or voice communication. Significant latency drastically reduces the benefits of real-time two-way communication, as the latency applies before receiving every single message in both directions. Reducing the transmission delay by 25%—though only fractions of a second—before each and every message noticeably improves the flow and feel of any communications. The benefit applies equally to both video and audio communications.

In addition to global communication, the Secure Global Satellite Network 10 enables a user to send instructions to anywhere on the globe with reduced transmission delay. For example, a drone pilot working from a control station within the United States may control a drone flying or operating on the other side of the world. The same 25% transmission delay reduction that benefits communications also improves the drone pilot's control of his or her drone. The Secure Global Satellite Network 10 provides information from the drone to the pilot (e.g., a video feed or sensor data) quicker than traditional GEO-based control systems. Similarly, the Secure Global Satellite Network 10 transmits each command from the pilot to the drone quicker than traditional GEO-based control systems. The Secure Global Satellite Network 10 improves a pilot's experience by providing more up-to-date information from the drone and transmitting instructions to the drone quicker. In addition to reduced transmission delays, the system also provides the added benefits of global drone coverage from anywhere to anywhere in the world at any time without significant additional ground assets in either the location of the pilot or the drone.

The same 25% transmission delay reduction that benefits communications also improves the drone pilot's control of his or her drone. The Secure Global Satellite Network 10 provides information from the drone to the pilot (e.g., a video feed or sensor data) quicker than traditional GEO-based control systems. Similarly, the Secure Global Satellite Network 10 transmits each command from the pilot to the drone quicker than traditional GEO-based control systems. The Secure Global Satellite Network 10 improves a pilot's experience by providing more up-to-date information from the drone and transmitting instructions to the drone quicker.

The Secure Global Satellite Network 10 may also provide a constant connection with aircraft or other systems anywhere on the globe. The Secure Global Satellite Network 10 can communicate with an aircraft (or ship or any other connected element) anywhere in the world at any time. The Secure Global Satellite Network 10 may provide ground updates, location updates, weather, or any other external information to aircraft, and the Secure Global Satellite Network 10 may similarly transmit information from the aircraft to a monitoring terminal anywhere in the world, such as aircraft location, system status, security, or emergency situations. The Secure Global Satellite Network 10 may even be used to provide entertainment (e.g., videos, audio, games) or remote connectivity to pilots or passengers onboard aircraft (or other vehicles) at any time. Similarly even manned or animal/plant inhabited space stations (e.g., the International Space Station or future stations) or shuttles in orbit may experience similarly improved connectivity (including coverage, uptime, reduced transmission delays, and reduced signal noise) through the Secure Global Satellite Network 10.

Additionally, the Secure Global Satellite Network 10 is configured to interface directly with other satellites outside of the GEO constellation. External satellites may target a transponder toward a GEO satellite 100 in the GEO constellation and maintain contact with ground stations, mobile users, or other satellites through the Secure Global Satellite Network 10. The Secure Global Satellite Network 10 is expressly configured to incorporate a specific transponder for interfacing with LEO and MEO satellites in equatorial orbits around the Earth. The GEO satellites 100 incorporate at least one transponder targeting the equatorial orbit. LEO and MEO satellites configured to interface with the Secure Global Satellite Network 10 may incorporate one or more transponders aimed away from Earth, toward the GEO satellites 100 in the Secure Global Satellite Network 10 above. In one embodiment briefly disclosed in a prior paragraph, the GEO satellites 100 may include at least one Ka-band transponder that covers the region where equatorial LEO and MEO satellites 200 will pass between the GEO satellite 100 and the planet 1, and the LEO and MEO satellites 200 will carry a GEO-facing transponder with a corresponding frequency band.

A basic understanding of the distance and velocity of different satellites may help emphasize the value and novelty of the present invention. (For the following basic examples, we are simplifying the calculations and explanation to a 2-body universe. In reality, scientists and engineers factor in numerous other variables including the gravitational force of other objects, drag, solar wind, and other variables to calculate better than we need for a basic understanding.) In orbital mechanics, a satellite or object can maintain a circular orbit when the cumulative forces on the satellite equals the centripetal force. The centripetal force (Fc) is the total force acting on the satellite to accelerate the satellite toward the center of the orbit to maintain a constant circular orbit. Satellites with elliptical orbits require slightly different calculations, but the concept is effectively the same. In the absence of any propulsion or external force, the satellite would not accelerate in any direction and would therefore continue travelling at a constant velocity in a straight line. The centripetal force for a circular orbit is the product of the satellite's mass (m) and the square of the satellite's velocity (v) divided by the distance between the center of the Earth and the satellite (r).

$$Fc = \frac{m \cdot v^2}{r}$$

Once a satellite has achieved a stable orbit, the cumulative force can effectively be simplified to the gravitational force of the planet on the satellite. The gravitational force draws the satellite toward the center of the planet and draws the planet toward the center of the satellite. The gravitational force can be calculated as the product of the gravitational $$\left(G, 6.67 \cdot 10^{-11} \frac{m^3}{kg \cdot s^2}\right)$$

and the mass of the two objects (the satellite (m) and the Earth (M)) divided by the square of the distance between the center of the Earth and the satellite (r).

$$Fg = G \frac{m \cdot M}{r^2},$$

$$G = 6.67 \times 10^{-11} \frac{m^3}{kg \cdot s^2}$$

Balancing the gravitational force to match the centripetal force, we can calculate that a the velocity necessary to maintain a satellite in a circular orbit at distance r from the center of the Earth is the square root of the product of the gravitational constant (G) and the mass of the Earth (M) divided by distance r. Mass of the satellite does not matter. Without an atmosphere, the shape of the satellite also does not matter.

$$v = \sqrt{\frac{G \cdot M}{r}} \text{ or } r = \frac{G \cdot M}{v^2},$$

The Gravitational constant and the mass of the Earth are constant, so the velocity of a satellite orbiting the Earth depends only on the distance from the Earth. The closer a satellite is to the Earth, the faster that satellite must travel to avoid crashing to Earth. The lowest altitude orbits require the highest velocities to maintain orbit.

By definition, a geosynchronous orbit is an orbit of 24 hours—matching the 24-hour period of Earth's rotation. A geostationary orbit is a geosynchronous equatorial orbit (travelling in the same direction as the Earth's rotation). Although we have referred to both geosynchronous and geostationary orbit satellites as GEO satellites in this application, for the most part, GEO satellites generally refers to geostationary satellites. Non-geostationary satellites in a geosynchronous orbit can also be referred to as inclined geostationary orbits (IGSO), but there are significantly more geostationary satellites than IGSO satellites presently in orbit. The unique benefit of a satellite positioned in a geostationary orbit is that the satellite appears to always orbit over the exact same point on the Earth. A ground station can aim a satellite dish at the satellite, and the satellite dish will never appear to move from the targeted position. A satellite or object orbiting the Earth can only maintain a geostationary orbit if the satellite is positioned in an equatorial orbit approximately 35,786 (22,236) kilometers above the surface of the Earth, or 42,164 (26,199) kilometers from the center of the Earth. If a satellite is slightly higher than that distance, the satellite would have an orbital period slightly longer than the Earth's rotation, and the satellite would appear to slide backwards across the sky over time, appearing to move slowly West across the sky. If a satellite is slightly closer than that distance, the satellite would have an orbital period shorter than the Earth's rotation, and the satellite would appear to slide forwards across the sky over time, appearing to move slowly East across the sky. (All assuming a non-retrograde satellite orbit.)

Different authorities list different slightly different altitude limits for a Low Earth Orbit (LEO) satellite. However, the rough altitude limit for a Low Earth Orbit (LEO) satellite is about 2,000 kilometers (approximately 1,200 miles) above the surface of the Earth. The Earth's equatorial radius is approximately 6,378 kilometers (3,963 miles), and the equatorial atmosphere extends approximately another 17 kilometers (11 miles). Accordingly, the orbital distance of a LEO satellite is anywhere from 6,395 to 8,378 kilometers (3,974 to 5,163 miles) from the center of the Earth. This means the velocity of a LEO satellite can range from 7.89 to 6.89 kilometers per second (17,649 to 15,412 miles per hour). At that velocity, these satellites have an orbital period of 85 to 128 minutes.

A satellite positioned between the definition for a LEO satellite and a geosynchronous or geostationary (GEO) orbit is defined as a Medium Earth Orbit (MEO) satellite. Therefore, MEO orbits fall between 2,000 to 35,786 kilometers (approximately 1,200 to 22,236 miles) above the surface of the Earth. Accordingly, the orbital distance of a MEO satellite is anywhere from 8,378 to 42,164 kilometers (5,163 to 26,199 miles) from the center of the Earth. This means the velocity of a LEO satellite can range from 6.89 to 3.07 kilometers per second (15412 to 6878 miles per hour). At that velocity, these satellites have an orbital period between 128 minutes to 24 hours.

As you can see from the above figures, LEO and MEO satellites appear to zip across the sky relative to a ground station observer. A LEO satellite will orbit the Earth between 12 and 16 times per day, while a MEO can be anywhere between 1 and 12 times per day. The ground station only has very limited periods to target and communicate with a transponder on the LEO or MEO while the LEO or MEO is above the horizon. An equatorial LEO or MEO will pass over the same points on the Earth's surface with each rotation.

However, if there is any incline to the LEO or MEO orbit, the rotation of the Earth beneath the inclined satellite will shift the surface of the Earth relative to the satellite orbit. When the LEO or MEO reaches the same point in its orbit, it will pass over a slightly different area of the Earth (calculable based on the incline and the relation between the Earth's rotational period and the satellite's orbital period). Notably, a LEO or MEO positioned in a polar orbit—an orbit orthogonal to an equatorial orbit—will actually pass over the North and South pole on each orbit, though the rest of its orbit will orbit over different areas of the Earth on consecutive orbits.

By selecting an orbital period (which is determined by orbital elevation) with an integer relation to the Earth's rotational period (approximating 24 hours for the present example), some special orbits may cross over the same point on the Earth one or more time per day. For example, a LEO satellite with a 90-minute orbit will orbit the Earth 16 times per day while the Earth rotates a full orbit. Similarly, a LEO satellite with a 120-minute orbit will orbit the Earth 12 times per day while the Earth rotates a full orbit. In both examples, the orbital path of the LEO satellite will orbit above the exact same spot on the Earth every 24 hours, regardless of inclination. In fact, the orbital path of the 120-minute orbit will pass above the same point on the Earth every 12-hours.

These two orbits are among the easiest-understood scenarios for predictable, consistent satellite access windows. Even in these optimal orbits, a satellite only passes overhead a single spot on the Earth every 12 or 24 hours. A ground transponder cannot communicate with a satellite through the curvature of the Earth. Communicating with a satellite at steep angles through the atmosphere increases both power requirements and interference noise. In addition to infrequent windows for communication, a LEO satellite may be moving through space at velocities over 10,000 miles per hour, requiring a ground transponder to track the quick-moving satellite across the sky. For example, the International Space Station (the ISS), orbiting 216 miles (348 kilometers) above the Earth and has a velocity of approximately 17,200 miles (27,700 kilometers) per hour. At that altitude and velocity, it only takes the ISS between 4 and 5 minutes to traverse the sky from one horizon to the opposite horizon. These narrow and infrequent windows demonstrate the true value of at least one feature of the present invention.

If a government, business, or individual does not have satellite transponders positioned around the globe, the windows for securely sending information to or retrieving information from the satellite are very narrow. Even with satellite transponders positioned around the globe, the government, business, or individual would again risk interception by forwarding these communications through ground-stations or multiple up-and-down satellite transmissions.

As information is transmitted from a first ground-station to a second ground-station—whether transmitting through wired, wireless, or even ground-to-satellite-to-ground communication routes—there is always a risk that the transmission may be intercepted or entirely blocked. For example, a first country may not wish to transmit sensitive security information through a border with a neighboring second country. The neighboring country may gain access to the secure transmission, or alternatively during hostile, emergency, high-traffic, or tense times the neighboring second country may sever transmissions routed across the border from the second country to the first country, severing the first country's access to critical information. In some cases, a corporation may wish to avoid routing sensitive information through a jurisdiction (city, county, state, nation, treaty organization, or any other similarly controlled area) with specific laws that may affect, restrict, or penalize the handling of certain data. Jurisdictional restrictions may attach to transmissions comprising consumer privacy data, security of private communications, financial records, health records, or even simply the ability to transmit any encrypted data.

For example, a corporation may wish to eliminate any data-transmission or storage that potentially exposes the transmission to European Union GDPR or California Consumer Privacy Act limitations. In another example, an organization may elect to avoid transmitting in or through certain countries to avoid having to share potential encryptions or communications, as required by some authoritarian intelligence agency.

In other cases, a country, company, or individual may wish to avoid any transmission of sensitive data across mass communication networks. Those public networks present additional risk for the transmission to be intercepted or misdirected.

The present invention reduces the risk of interception by minimizing—and in many cases, entirely eliminating—the need to route a transmission across any terrestrial networks. The Secure Global Satellite Network 10 can route a transmission directly from the secure satellites in orbit to a satellite dish or antenna controlled by the intended recipient. This transmission from the Secure Global Satellite Network 10 to the recipient can also be further secured through encryption, focused beam transmission to a known location, or any other recognized method for securely routing information through conventional networks.

The Secure Global Satellite Network 10 enables direct transmissions along a transmitting ground station-GEO Network-receiving ground station communication route. The Secure Global Satellite Network 10 enables direct transmissions along a transmitting LEO (or MEO)-GEO Network-receiving ground station communication route. The Secure Global Satellite Network 10 enables direct transmissions along a transmitting ground station-GEO Network-receiving LEO (or MEO) communication route. The Secure Global Satellite Network 10 enables direct transmissions along a transmitting LEO (or MEO)-GEO Network-receiving LEO (or MEO) communication route. The Secure Global Satellite Network 10 enables direct transmissions along a transmitting ground station-GEO Network-all nodes in the Secure Global Satellite Network 10 communication route.

Any of these communication routes can be transmitted from its origin to its intended destination through the Secure Global Satellite Network 10 without ever touching a public network, any network outside of the organization's control, the internet, or crossing any national borders. Additionally, a single transmission may be designated for multiple recipients through the Secure Global Satellite Network 10, enabling the transmitting ground station or satellite to upload a message once to the GEO Network, but then route and transmit the same message (either simultaneously or asynchronously) to multiple designated recipients. Alternatively, the Secure Global Satellite Network 10 may also enable general broadcast of a single uploaded message to all or a subset of authorized nodes (be they ground station, satellite, or a mix thereof) in the user's network.

In one example, an Earth observation satellite 200 in low earth orbit (LEO) may be configured and tasked to monitor a contested or potentially vulnerable national border. This Earth observation satellite (EOS) 200 could route a transmission directly from the Earth observation satellite 200 to a geosynchronous satellite 100 in the GEO network of the Secure Global Satellite Network 10, and the Secure Global Satellite Network 10 can route that transmission directly from a geosynchronous satellite 100 to the national Department of Defense, minimizing potential communication vulnerabilities.

In a second related example, a ground-based monitoring system may be configured to transmit a signal directly to a geosynchronous satellite 100 in the GEO network of the Secure Global Satellite Network 10 and the Secure Global Satellite Network 10 can route that transmission directly from a geosynchronous satellite 100 to the intended recipient.

In each case, when the transmission reaches the GEO Network of the Secure Global Satellite Network 10, if the Secure Global Satellite Network 10 determines that the intended recipient is not currently accessible to the original receiving GEO satellite 100, the receiving GEO satellite 100 may route the transmission within the GEO Network of the Secure Global Satellite Network 10 to a second (or even third or higher) GEO satellite 100 that is better positioned or configured to direct the transmission to the intended recipient.

In a specific example of the transmission routing within the GEO network of the Secure Global Satellite Network 10, a LEO satellite 200 orbiting over New Zealand may transmit a message to the Secure Global Satellite Network 10 intended for a first recipient in Switzerland and a second recipient in India. The transmission route may follow a transmission route from the LEO satellite 200 to a first GEO satellite 100 positioned above Oceania. The first GEO satellite 100 over New Zealand securely routes the message to a second GEO satellite 100 orbiting above the Indian subcontinent. The second GEO satellite 100 further securely routes the message to a third GEO satellite 100 orbiting above Europe. Ultimately, the second GEO satellite 100 securely routes the message directly to the intended second recipient in India and the third GEO satellite 100 securely routes the message directly to the intended recipient in Switzerland.

In some embodiments, each communication includes transmission routing instructions. The transmission routing instructions may be set or modified at various points within the Secure Global Satellite Network 10. For example, the transmission routing instructions may 1) be established by the initial transmitting user terminal 300 or satellite 200, 2) be established by the Secure Global Satellite Network 10 internal processing (possibly in a central ground-based control center or within the GEO satellites 100), or 3) dynamically modified as the message is routed through the network 10.

In some cases, the initial communication from the originating or transmitting ground station 300 (or satellite 200) may include special message handling instructions designating the communication route from the origin to the destination. In other instances, the Secure Global Satellite Network 10 may include processing and handling for transmission routing through the network directly in the satellite of the GEO Network.

Upon receiving an initial communication, the Secure Global Satellite Network 10 will review the initial communication's transmission routing instruction. The Secure Global Satellite Network 10 will then handle and route the communication according to the transmission routing instructions.

In some embodiments, the initial communication sets the preferred or required transmission routing instruction. Different users may prefer differing levels of specificity or flexibility in the transmission routing instructions based on several variables. The transmission routing instruction can range anywhere from complete routing flexibility (allowing the Secure Global Satellite Network 10 to select the transmission route) all the way to exacting specificity (specifically establishing each exact node along the communication route all the way from the origin to the destination).

Several variables that may affect or impact the selection of either flexible or specific routing instructions. Some of these variables include urgency, flexibility, cost, reliability, bandwidth, security concerns, jurisdictional concerns, system maintenance, time-sensitivity of the data, or the selection of multiple recipients.

In some cases, instead of establishing a specific route, a user may indicate transmission route preferences or criteria, deferring to the Secure Global Satellite Network 10 to compute the actual transmission route according to the selected preferences or criteria. For example, without specifically indicating the exact transmission route, a user may select for the Secure Global Satellite Network 10 to route their message through:

1) the quickest communication route (shortest time),
2) the most cost-effective communication route,
3) a route according to a capped or maximum financial or resource cost,
4) the shortest distance communication route (not necessarily the fastest),
5) the communication route including the fewest nodes,
6) the most secure communication route,
7) the most reliable communication route,
8) a premium or higher toll route, 9) a route that specifically travels over multiple intended destinations, delivering to each intended recipient along the route,
10) a route that specifically avoids travelling over specific jurisdictions or avoids certain satellites/satellite constellations,
11) multiple redundant communication routes, or
12) according to any other user preference.

In any of these cases, the user (or system owner) may designate one or more preferences or criteria, and the transmission route is optimized according to those preferences or criteria by the Secure Global Satellite Network 10. The transmission route processing may occur 1) in the transmitting computer system, 2) in one or more GEO satellites 100 of the GEO satellite network, 3) by a ground-based processing or control center, or 4) by a distinct transmission route processing satellite positioned in LEO, MEO, or GEO orbit. In some embodiments, the transmission route preferences are processed separately from the actual message to be transmitted. For example, the transmitting system (be it ground-based or satellite based) will send the transmission route preferences (separate from the actual message) to the Secure Global Satellite Network 10, and the Secure Global Satellite Network 10 will set the processed optimized route. Once the message is received by the Secure Global Satellite Network 10, the message is then routed according to the processed optimized route selected by the processor. In some embodiments, the Secure Global Satellite Network 10 sends a copy of the optimized route to the transmitting system before, during, or after the message is transmitted from the transmitting system. In other embodiments, the optimized route may not be sent back to the transmitting system. In some instances, the Secure Global Satellite Network 10 maintains a ledger of transmissions, confirming transmission and delivery of each message, and users can review or search the ledger for specific transmission IDs. In some embodiments, the ledger may be anonymous and/or may maintain the confirmations without any information regarding the actual content of the message.

In some embodiments, the Secure Global Satellite Network 10 will send a confirmation to the transmitting system when the message reaches its one or more intended recipient destinations. In some embodiments, the Secure Global Satellite Network 10 may send confirmations to the transmitting system as the message successfully passes through each designated node.

In some embodiments, the Secure Global Satellite Network 10 will send an error to the transmitting system if the message cannot be successfully transmitted to the intended recipient destination or according to the route selected by the transmitting system or along the optimized route. In some embodiments, the Secure Global Satellite Network 10 will automatically route the message along an alternate recalculated route if the original selected route or optimized route transmission is unsuccessful. In some embodiments, the Secure Global Satellite Network 10 will save the transmission in memory while waiting for the transmitting system to confirm that the transmitting system wants the transmission routed according to a recalculated route (potentially recalculating according to the original preferences or criteria) or if the transmitting system sends a secondary replacement route. In some cases, the original transmission routing instructions may include the user's error handling preferences, such as including designated secondary (or tertiary or higher order) routes or user authorization to automatically reroute or delete the message if the initial route fails.

Although a ground station can only maintain communications with a LEO satellite 200 during a few brief windows of time, that same LEO satellite 200 is easily tracked and can maintain constant communication with one of the GEO satellites 100 in the Secure Global Satellite Network 10 throughout its entire orbit. The ground station 300 can communicate indirectly with the same LEO satellite 200 by communicating through the GEO satellites 100 in the Secure Global Satellite Network 10, anywhere and at any time during the LEO satellite 200's orbit.

Rather than securely interfacing with a single ground-transponder 300 only once per 12 or 24 hour period and rather than increasing risk of interception by setting up multiple ground transponders adding additional risk of signal interception, the LEO satellite 200 is always orbiting beneath and within range of one of the GEO satellites 100 that form the backbone of the Secure Global Satellite Network 10. Similarly, all ground-stations 300 anywhere on the planet (excluding the extreme polar regions, though this coverage gap can be addressed through patchwork coverage provided by additional LEO coverage) are always in range of one of the GEO satellites 100 that form the backbone of the Secure Global Satellite Network 10. The Secure Global Satellite Network 10 can provide 24-hour point-to-point communication from any ground station 300 on the Earth 1 to any LEO satellite 200 orbiting the Earth 1 and vice versa. In some disclosed embodiments, the GEO satellites 100 of the Secure Global Satellite Network 10 only target equatorial LEO and MEO satellites 200; however, this limitation is not universal and other embodiments could provide coverage for non-equatorial orbit LEO and MEO satellites 200.

As demonstrated by the figures above, the Secure Global Satellite Network 10 is extremely beneficial for connecting a user anywhere on Earth 1 to control, send data to, receive data from, or interact with a LEO or MEO satellite 200 anywhere in orbit around the Earth 1. Instead of communicating with fast-moving LEO or MEO satellites 200 only during narrow communication windows when the LEO or MEO satellite 200 is positioned above the user's one or more ground terminals 300, the Secure Global Satellite Network 10 extends that user's ability to interact with his, her, or their non-GEO satellite 200 anywhere in orbit at any time. Some examples of external satellite systems 200 that can benefit from interfacing through the Secure Global Satellite Network 10 include earth observation satellites, space telescopes, LEO networks, global data coverage networks, distributed crypto ledgers, data storage, and secure system updates.

Any LEO or MEO satellite 200 that interfaces with the Secure Global Satellite Network 10 does not require direct interaction with ground stations 300, instead routing and receiving any transmissions through the Secure Global Satellite Network 10. This transmission routing through the Secure Global Satellite Network 10 increases reliability, security, uptime, and availability of communication with any LEO or MEO satellite 200 around the globe.

Orbital satellites are a useful tool in observing, measuring, and recording both human and natural changes around the Earth 1. There are currently a number of earth observation satellites 200 and satellite networks 200 currently in orbit around the Earth 1, tasked with roles ranging from monitoring changes to our ecosystem to remotely gathering intelligence on other countries or corporations. Earth observation satellites 200 are used by scientists and corporations to monitor natural variables including the oceans and ice sheets, the atmosphere, the weather (AURA, CALIPSO, CloudSat), soil and vegetation, and even the Earth's gravitational field and radiation absorption. Earth observation satellites 200 are also used to monitor human behaviors such as infrastructure development, shipping, traffic, and military placement. However, Earth observation satellites 200 often orbit at relatively low orbits, even compared to other LEO satellites 200. By orbiting closer to the Earth 1, an Earth observation satellite 200 may capture a more detailed image. However, as previously described, the closer a satellite 200 is to the planet 1, the faster that satellite must travel to balance the force of gravity. Often Earth observation satellites 200 also occupy significantly inclined orbits. Many Earth observation satellites 200 even occupy polar orbits, orthogonal to the planet's equator. The low orbit, high velocity, and inclined orbit all combine to exacerbate the narrow communication window issues described above with respect to orbital mechanics and benefits of the Secure Global Satellite Network 10. The Secure Global Satellite Network 10 extends the user's access to the user's Earth observation satellite 200 from anywhere on the planet 1 to anywhere in the satellite's orbit at any time. Instead of collecting data dumps only during narrow windows, the communication path from data/image capture to recipient is always open, enabling more complete data transfer and faster access to the information from these satellites. The Secure Global Satellite Network 10 may operate in place of—or even in addition to—the satellite network described in patent application Ser. No. 16/389,938, filed Apr. 20, 2019 and titled "Earth Observation Satellite Information Routing System". Any of the elements described in the patent application for the Earth Observation Satellite Information Routing System may be easily incorporated, modified, and/or configured to communicate through the Secure Global Satellite Network 10 without departing from the present invention.

Similarly, the Secure Global Satellite Network 10 may also increase the functionality, uptime, data transmission, delay, or other issues relating to controlling and retrieving information from space telescopes. The Secure Global Satellite Network 10 may provide significant added value to a controller of a space telescope or other space-monitoring system, in many cases providing the same types of benefits that apply to the Earth observation satellites 200.

In addition to functioning along with individual space telescopes, the Secure Global Satellite Network 10 may also be configured to interact with other satellite constellations, including LEO constellations 200. LEO constellation 200 operators may monitor the status of each of their LEO satellites 200 through the Secure Global Satellite Network 10. LEO constellation 200 operators may also choose to offload some of their data traffic through the Secure Global Satellite Network 10. For example, some LEO constellations 200 are configured to provide global data or communication coverage for customers on the Earth 1. Rather than routing all data through the LEO constellation 200, the LEO constellations 200 may be configured to also communicate through the Secure Global Satellite Network 10. In a first embodiment, a LEO constellation 200 may route less latency-critical communications through the Secure Global Satellite Network 10. In another embodiment, a LEO constellation 200 may back-up data through the Secure Global Satellite Network 10, verifying the data received through the LEO constellation 200 by comparing to the data routed through the Secure Global Satellite Network 10 as a back-up or secondary channel. In another embodiment, during periods of peak traffic, a LEO constellation 200 may simply route excess data through the Secure Global Satellite Network 10. In still another embodiment, a LEO constellation 200 may transmit data to the Secure Global Satellite Network 10 specifically so the Secure Global Satellite Network 10 can cross-strap the data transmission from a first frequency to a second frequency. In still another embodiment, the Secure Global Satellite Network 10 may be used to upload a system update, command and control instructions, or any other secure information to one, many, or all satellites in the LEO constellation 200 simultaneously.

The Secure Global Satellite Network 10 may also incorporate and rely on a number of LEO or MEO satellites 200, in addition to the GEO satellite 100 backbone. In one embodiment, the Secure Global Satellite Network 10 includes a number of LEO or MEO satellites 200 configured to provide additional functionality for the Secure Global Satellite Network 10 and its operators or users. These LEO or MEO satellites 200 may include data storage satellites. Because Geosynchronous satellites must orbit at a specific orbital distance which falls exactly in one of the high radiation areas of space known as the Van Allen belts, storing data in non-GEO satellites may increase system reliability and functionality. The Secure Global Satellite Network 10 may operate as the communication backbone for the communications backbone (or in some cases in addition to existing communications networks or as a back-up data path) for a data storage and transfer network satellite constellation, such as the system described in patent application Ser. No. 15/225,826, filed Aug. 2, 2016 and titled "SPACE-BASED ELECTRONIC DATA STORAGE AND TRANSFER NETWORK SYSTEM" and issued as U.S. Pat. No. 9,602,580 on Mar. 21, 2017. Any of the elements described in the patent application for the SPACE-BASED ELECTRONIC DATA STORAGE AND TRANSFER NETWORK SYSTEM may be easily incorporated, modified, and/or configured to communicate through the Secure Global Satellite Network 10 without departing from the present invention.

Another benefit of the Secure Global Satellite Network 10 is the ability to securely transmit information to a satellite anywhere in its orbit or a ground-station anywhere in the world at any time, including the ability to transmit an update to all satellites in a system or to all ground-stations of a system simultaneously. These secure communications could include software updates, encryption keys, distributed ledgers, time synchronization instructions, back-ups of distributed ledgers, or any other secure or time-sensitive transmission.

An important feature of the Secure Global Satellite Network 10 is the security benefit provided by minimizing interception-vulnerable data nodes and routes. Accordingly, it may be important that LEO and MEO satellites 200 configured to interface with the Secure Global Satellite Network 10 be configured to transmit to the GEO satellites 100 in the GEO constellation of the Secure Global Satellite Network 10 only under set parameters.

Additionally, in some embodiments, rather than broad global coverage, the transponder on the GEO satellite 100 may be set to specifically target a single location on the planet 1 or in orbit. Targeted transmission can increase security and further reduce the risk of detecting or intercepting secure communications. The LEO satellites 200, MEO satellites 200, and ground-transponders 300 may spot-beam target their GEO-facing transponders toward the known position of a GEO satellite 100 in the Secure Global Satellite Network 10 (and vice versa) to minimize risk of interception. In some embodiments, only communications to/from expected positions in space or on the ground may be executed or forwarded along the Secure Global Satellite Network 10.

In other embodiments, the LEO or MEO 200 may only communicate to or from the GEO satellites 100 (and vice versa) during set time intervals, refusing to execute commands outside those expected time intervals. The GEO satellites 100 in the Secure Global Satellite Network 10 may be set to only receive and forward data received during pre-set timestamp/time lock periods.

In some embodiments, data may be encoded or encrypted prior to transmission to or from the Secure Global Satellite Network 10, providing an additional layer of protection. In some embodiments, the system relies on a universal encrypted ledger for verifying authenticity and authority of various communications, or for any other satellite 200 or communication system 300.

When a GEO satellite 100 in the Secure Global Satellite Network 10 receives an unanticipated data transmission, the communication may be treated as normal, blocked, prioritized, deprioritized, or even trigger security alerts, depending on the preferences set by the Secure Global Satellite Network 10 operators. Any communications from unexpected points in space or on the ground, outside of the set time interval, at incorrect frequencies, or absent any other security protocol may trigger an alert to operators, possibly limiting functionality of affected satellites until the security questions are investigated and addressed.

The foregoing description has described embodiments of a Secure Global Satellite Network 10 including geosynchronous satellites in combination with low earth orbit satellites and/or medium earth orbit satellites, and combinations thereof. It should be understood that secure global communication and data transfer is only one exemplary application of the disclosed system.

While the above implementations and aspects primarily discuss low-earth orbiting network satellites 200 and allowing access terminals 300 to communicate with the low-earth orbiting network satellites 200 through geostationary communications satellites 100, it is to be understood that a network 10 incorporating a different configuration of satellites could be configured without departing from the present application. Although some embodiments or aspects refers to geostationary or geosynchronous communications satellites or low earth orbit network satellites or storage satellites, it should be understood that those embodiments or aspects could additionally or instead incorporate satellites in alternate orbits (e.g., low earth orbit, middle earth orbit, equatorial orbit, polar orbit, inclined orbit, parallel orbits, elliptical orbits, . . . ). By way of example, the communicatively linked GEO satellites could easily be replaced by a plurality of MEO satellites. In this configuration, the LEO satellites would simply track and communicate through the plurality of MEO satellites in the same way that communication with GEO satellites has been described.

Additionally, in at least one embodiment, in place of the communications satellites, the network satellites, or the access terminals, some embodiments could incorporate sub-orbital elements (not shown) such as antennae, aircraft, airborne, automobiles, balloons, blimps, dirigibles, drones, gliders, jets, kites, mobile devices, planetary stations, rigid airships, ships, space stations, spacecraft, stationary data centers, mesh network devices, or watercraft. These sub-orbital elements (not shown) could function similarly to the satellite or access terminal equivalents, with adjustments to account for atmospheric operation, such as including elements to provide navigation, propulsion, or buoyancy. The sub-orbital elements may communicate via radio frequency or laser link similar to the inter-satellite links used by satellites, and the sub-orbital element may communicate directly with access terminals 300, GEO satellites 100 in the GEO network, or LEO satellites 200. Such a Global Secure Satellite Network 10 could be configured to work in many configurations and with additional satellites without departing from the spirit of the present invention. Such a Global Secure Satellite Network 10 would provide similar benefit whether the access terminal 300 communicates directly with the GEO satellites 100 configured for data storage or communicates through intermediate communications satellites. In various embodiments, the Global Secure Satellite Network 10 could be configured to include more or fewer satellites, a greater or lesser orbital radius, more or fewer orbital planes, different types of satellites, multiple independent networks, alternative communication systems, additional sensors, or security measures.

Although various aspects are herein disclosed in the context of certain preferred embodiments, implementations, and examples, it will be understood by those skilled in the art that the present invention extends beyond the specifically disclosed embodiments to other alternative embodiments and/or uses of the inventive aspects and obvious modifications and equivalents thereof. In addition, while several variations of the aspects have been noted, other modifications, which are within their scope, will be readily apparent to those of skill in the art based upon this disclosure. It should be also understood that the scope this disclosure includes the various combinations or sub-combinations of the specific features and aspects of the embodiments disclosed herein, such that the various features, modes of implementation and operation, and aspects of the disclosed subject matter may be combined with or substituted for one another. Thus, it is intended that the scope of the present invention herein disclosed should not be limited by the particular disclosed embodiments or implementations described above, but should be determined only by a fair reading of the claims.

Similarly, this method of disclosure, is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. A Direct Routing Global Satellite Network System for transmitting information comprising:
   a plurality of network satellites that are communicatively coupled to each other through a continuous loop of direct inter-satellite laser links between consecutive network satellites, forming at least one continuous communication loop of network satellites around a planet that the network satellites orbit and, each network satellite comprising:
   a first power system comprising a first power source and a first power storage component capable of storing power received from the first power source;
   a first communications array powered by the first power system and configured to establish the direct inter-satellite laser links with a second communications array of a second network satellite;
   a second communications array powered by the first power system and configured to establish the inter-satellite laser links with a first communications array of a third network satellite;

a third communications array comprising at least 4 Ku frequency band transponders covering a planet that the network satellite orbits and configured to establish a communication channel with a one or more ground terminal; and a fourth communications array comprising at least 1 Ka frequency band transponder configured to establish a communication channel with a one or more non-network satellite that is not one of the network satellites;

wherein each network satellite orbits at least 2000 km above sea level;

wherein each network satellite is configured to transmit a signal to any other network satellite through the inter-satellite laser links between the network satellites;

wherein each network satellite is configured to maintain the inter-satellite laser link in an open state with at least two other network satellites at all times;

wherein a first network satellite is configured to receive the signal from either a first one of the non-network satellites outside of the Direct Routing Global Satellite Network through the fourth communication array or a first one of the ground terminals through the third communication array;

wherein the first network satellite is configured to retransmit the signal to the second network satellite;

wherein the second network satellite is configured to retransmit the signal to either a second one of the non-network satellites or a second one of the ground terminals outside of the Direct Routing Global Satellite Network; and wherein the signal does not route through any ground station or non-network satellite during transmission from the first network satellite to the second network satellite.

2. The Direct Routing Global Satellite Network System of claim 1, wherein the network satellites orbit at least 35000 km above sea level.

3. A Direct Routing Global Satellite Network System for transmitting information comprising:

a plurality of network satellites orbiting at least 2000 km above sea level that are communicatively coupled to each other through a continuous loop of direct inter-satellite links between network satellite, forming at least one continuous communication loop of network satellites around a planet that the network satellites orbit and, each network satellite comprising:

a first power system comprising a first power source and a first power storage component capable of storing power received from the first power source;

a first communications array powered by the first power system and configured to establish the direct inter-satellite links communication channel with a second communications array of a second network satellite;

a second communications array powered by the first power system and configured to establish the inter-satellite links communication channel with a first communications array of a third network satellite;

a third communications array powered by the first power system and configured to establish a communication channel with a one or more ground terminal; and a fourth communications array powered by the first power system and configured to establish an inter-satellite link communication channel with a one or more non-network satellite that is not one of the network satellites;

wherein each network satellite orbits at least 2000 km above sea level; and wherein each network satellite is configured to transmit a signal to any other network satellite through the inter-satellite link communication channels between the network satellites.

4. The Direct Routing Global Satellite Network System of claim 3, wherein the network satellites orbit at least 35000 km above sea level.

5. The Direct Routing Global Satellite Network System of claim 3, wherein the network satellites orbit between 2000 km and 35000 km above sea level.

6. The Direct Routing Global Satellite Network System of claim 3, wherein the communications arrays comprise either laser transponders or radio frequency transponders or a combination thereof.

7. The Direct Routing Global Satellite Network System of claim 3, wherein the third communications array comprises at least 4 transponders covering the planet and configured to establish a communication channel with a one or more ground terminal.

8. The Direct Routing Global Satellite Network System of claim 3, wherein the third communications array comprises at least 4 Ku frequency band transponders covering the planet and configured to establish a communication channel with a one or more ground terminal.

9. The Direct Routing Global Satellite Network System of claim 3, wherein the fourth communications array comprises at least 1 Ka frequency band transponder configured to establish a communication channel with a one or more non-network satellite that is not one of the network satellites.

10. The Direct Routing Global Satellite Network System of claim 3, wherein each network satellite is configured to maintain the inter-satellite laser link in an open state with at least two other network satellites at all times.

11. The Direct Routing Global Satellite Network System of claim 3, wherein a first network satellite is configured to receive the signal from either a first one of the non-network satellites outside of the Direct Routing Global Satellite Network through the fourth communication array or a first one of the ground terminals through the third communication array;

wherein the first network satellite is configured to retransmit the signal to the second network satellite; and wherein the second network satellite is configured to retransmit the signal to either a second one of the non-network satellites or a second one of the ground terminals outside of the Direct Routing Global Satellite Network.

12. The Direct Routing Global Satellite Network System of claim 3, wherein a signal does not route through any ground station or non-network satellite during transmission from the first network satellite to the second network satellite.

13. The Direct Routing Global Satellite Network System of claim 3, wherein the network satellites are positioned at approximately the same orbital radius within the same orbital plane.

14. A network satellite for incorporation in a Direct Routing Global Satellite Network System, the network satellite comprising:

a first power system comprising a first power source and a first power storage component capable of storing power received from the first power source;

a first communications array powered by the first power system and configured to establish the direct inter-satellite links with a second communications array of a second network satellite;

a second communications array powered by the first power system and configured to establish the direct inter-satellite links with a first communications array of a third network satellite;

a third communications array powered by the first power system and configured to establish a communication channel with a one or more ground terminal; and a fourth communications array powered by the first power system and configured to establish an inter-satellite link communication channel with a one or more non-network satellite that is not one of the network satellites;

wherein each network satellite orbits at least 2000 km above sea level;

wherein the network satellite is configured to transmit a signal to any second network satellite through the inter-satellite link communication channels between the first network satellite and the second network satellite.

15. The network satellite for incorporation in a Direct Routing Global Satellite Network System of claim 14, wherein the network satellites orbit at least 35000 km above sea level.

16. The network satellite for incorporation in a Direct Routing Global Satellite Network System of claim 14, wherein the communications arrays comprise either laser transponders or radio frequency transponders or a combination thereof.

17. The network satellite for incorporation in a Direct Routing Global Satellite Network System of claim 14, wherein the third communications array comprises at least 4 Ku frequency band transponders covering the planet and configured to establish a communication channel with a one or more ground terminal.

18. The network satellite for incorporation in a Direct Routing Global Satellite Network System of claim 14, wherein the fourth communications array comprises at least 1 Ka frequency band transponder configured to establish a communication channel with a one or more non-network satellite that is not one of the geostationary network satellites.

19. The network satellite for incorporation in a Direct Routing Global Satellite Network System of claim 14, wherein a first network satellite is configured to receive the signal from either a first one of the non-network satellites outside of the Direct Routing Global Satellite Network through the fourth communication array or a first one of the ground terminals through the third communication array;

wherein the first network satellite is configured to retransmit the signal to the second network satellite; and wherein the second network satellite is configured to retransmit the signal to either a second one of the non-network satellites or a second one of the ground terminals outside of the Direct Routing Global Satellite Network.

20. The network satellite for incorporation in a Direct Routing Global Satellite Network System of claim 14, wherein the network satellites are positioned at approximately the same orbital radius within the same orbital plane.

* * * * *